March 1, 1927.　　　J. C. NANGANO　　　1,619,531

OIL INDICATOR

Filed Sept. 4, 1924

Witness:
W. Hall

Inventor:
Joseph C. Nangano
By Hazard & Miller
Attorneys

Patented Mar. 1, 1927.

1,619,531

UNITED STATES PATENT OFFICE.

JOSEPH C. NANGANO, OF SAN PEDRO, CALIFORNIA.

OIL INDICATOR.

Application filed September 4, 1924. Serial No. 735,893.

This invention relates to indicators adapted to disclose the quality or condition of fluid.

It is a broad object of the invention to provide an indicator primarily adapted to be associated with oiling systems of steam or internal combustion engines which will indicate the condition of the oil as to whether a large quantity of foreign matter is therein.

It is a further object of the invention to provide an indicator to be associated with the oiling system of a heat engine, wherein a gas chamber is mounted upon an oil conduit such that oil flowing through the conduit will be directed upon the walls of the gas chamber thereby permitting the condition of the oil to be clearly seen.

It is still a further object of the invention to provide an oil indicator which consists of a transparent chamber into which oil passing through an oil conduit may be discharged and which will be simple, cheap and durable, and which may be easily and quickly assembled.

With the above and other objects in view, reference is had to the accompanying drawings for an illustrative embodiment of the invention, wherein—

Figure 1:
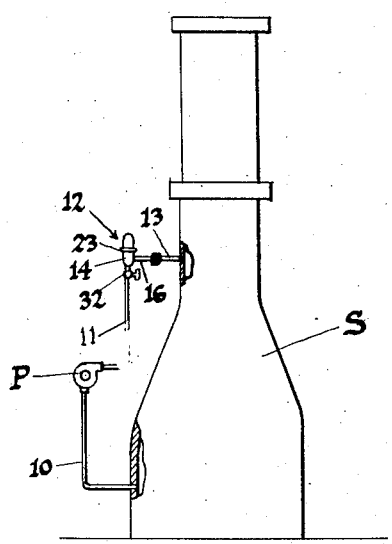
Fig. 1, is a side elevation of a suitable steam engine to which the oil indicator is shown as being applied.

Referring to the accompanying drawings wherein similar reference characters refer to similar parts, a suitable steam engine S shown for illustrative purposes only, has in the bottom of its crank case a suitable pipe 10 for withdrawing oil therefrom and a pump P connected to the pipe 10 for raising the oil through a second pipe 11 to the indicator, generally designated at 12, from which oil may pass to within the crank case of the steam engine through a pipe 13.

Figure 2:
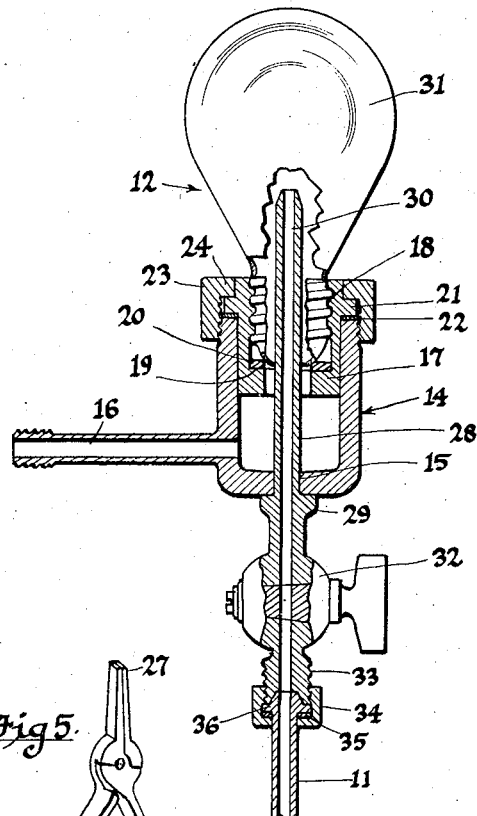
Fig. 2, is a vertical section of the indicator in one of its preferred forms.

In the form of indicator illustrated in Fig. 2, the device consists of a receptacle or body portion 14 having an opening 15 in the bottom thereof and a suitable opening 16 in the form of a projecting externally threaded nipple extending from one side of the receptacle 14. A socket member 17 is internally threaded as at 18 and has provided therein a shoulder 19 upon which rests a suitable gasket or packing 20. The socket member 17 has an external shoulder 21 adapted to rest upon packing 22 upon the rim of the receptacle or body portion 14. An internally threaded sleeve 23 is threaded to the body portion 14 and has an internal flange 24 which engages the external shoulder 21 of the socket member 17.

Figure 5:
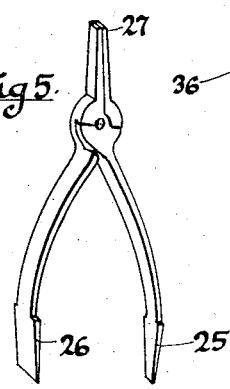
Fig. 5, is a perspective view of a tool especially adapted to be used in assembling the indicator as shown in Fig. 2.

In the device as shown in Fig. 2, the glass or transparent chamber is preferably made from an old electric light bulb, by employing the tool shown in Fig. 5 and using the pointed handle member 25 to remove the contact on the base of the bulb. The enlarged handle member 26 of the tool may then be used to ream the sealing wax from within the base of the electric light bulb and the jaws 27 of the pinchers shown in Fig. 5 may be used to withdraw the filament and supports therefrom. This electric light bulb having the filament removed is threaded into the socket member 17 and has its lower portion resting against the gasket 20.

A suitable nozzle 28 having a shoulder 29 is inserted into the opening 15 of the receptacle 14 such that the shoulder 29 bears upon the bottom of the receptacle with the end 30 extending up into the transparent chamber or electric light bulb 31. The nozzle 28 has a suitable valve 32 of ordinary construction associated therewith for controlling the fluid flow through the nozzle 28. The nozzle 28 is threaded as at 33 to receive a suitable packing sleeve 34, compressed packing 35 against a shoulder 36 formed upon the end of the pipe 11, so as to form a tight connection.

From the above it is seen that by opening the valve 32, oil may be admitted to the nozzle 28 and discharged therefrom against the walls of the glass chamber 31 from which it may trickle or flow downwardly into the receptacle 14 and pass outwardly therefrom through the nipple 16 which is connected to the pipe 13. By having the oil discharged against the walls of the transparent chamber 31, any foreign matter such as carbon, dirt or grit may be easily detected by merely looking in the oil discharged against the walls of the transparent chamber.

Figure 3:
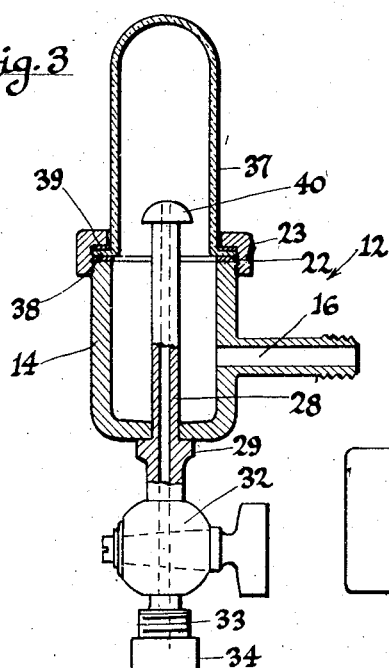
Fig. 3, is a vertical section of a modification of the indicator.

In the modification shown in Fig. 3, the receptacle 14 has a tubular glass chamber 37 which is provided with lateral flanges 38 resting upon the gasket 22 upon the upper rim of the receptacle 14, the internally threaded sleeve 23 has the flange 24 engaging a gasket 39 resting on the lateral flanges 38. The nozzle 28 in this form is provided with a suitable head 40 projecting upwardly into the transparent chamber 37. The valve 32 and discharge opening 16 are substantially the same in this modification as in that shown in Fig. 2. Fluid enters by passing through the valve 32 and is discharged from the nozzle 28 into the glass chamber 37 from which it trickles or flows downwardly into the receptacle 14 and is discharged through the nipple 16.

Figure 4:
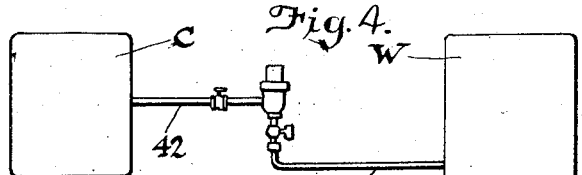
Fig. 4, is a diagrammatic view of the indicator being used in connection with other devices than the oil system of a heat engine.

In Fig. 4, the indicator has been illustrated as associated with a condenser of a steam engine. It is well known that steam engines having condensers have to have additional water supplied to them at frequent intervals. In Fig. 4, the condenser is shown at C and the vacuum formed therein serves to draw water from the water supply tank W through the pipes 41 and 42 and through the indicator, so that the water is discharged from the nozzle 28 against the glass chamber, so that the condition of the water may be easily and quickly ascertained.

It is to be understood that various changes in the details of construction may be made without departing from the spirit or scope of the invention as defined by the appended claim.

What I claim is:

An indicator of the class described comprising a body portion having a chamber open at the top and a projecting externally threaded nipple extending from one side, there being an opening at the center of the bottom of the chamber, the upper end of the body around the chamber being finished, a gasket upon the finished upper end of the body, an internally threaded socket member fitting within the chamber and having a flange resting upon the gasket, an internally threaded sleeve screwed upon the body and having a flange engaging the flange of the socket, an old electric light bulb screwed into the sleeve, the filament and support being removed from the bulb, there being an internal shoulder at the lower end of the sleeve and a gasket upon the shoulder against which the light bulb presses, and a nozzle extending upwardly through the central opening of the body and into the light bulb.

In testimony whereof I have signed my name to this specification.

JOSEPH C. NANGANO.